United States Patent [19]
Wetzel et al.

[11] Patent Number: 5,796,571
[45] Date of Patent: Aug. 18, 1998

[54] CONTROL DEVICE FOR A TWO-HAND CONTROL MEANS FOR CONTROLLING PRESSES FOR INSTANCE

[75] Inventors: Uwe Wetzel, Stockholm; Nils Svensson, Vagnhärad, both of Sweden

[73] Assignee: Ross Operating Valve Company, Troy, Mich.

[21] Appl. No.: 759,893

[22] Filed: Dec. 3, 1996

[30] Foreign Application Priority Data

Dec. 19, 1995 [SE] Sweden .................. 9504535

[51] Int. Cl.$^6$ ........................... H01H 9/00
[52] U.S. Cl. ........................ 361/190; 307/326
[58] Field of Search ................... 307/326, 328, 307/118; 361/160, 170, 178, 189, 190, 191–193; 192/131 R, 129 A, 129 R

[56] References Cited

U.S. PATENT DOCUMENTS

| | | |
|---|---|---|
| 3,605,554 | 9/1971 | Philbrick . |
| 3,813,021 | 5/1974 | Kramer .................. 228/1 |
| 3,933,065 | 1/1976 | Janu et al. .................. 83/62 |
| 4,041,842 | 8/1977 | Stunkel . |
| 4,138,005 | 2/1979 | Schneider et al. .................. 192/12 C |
| 4,227,547 | 10/1980 | Cameron . |
| 4,257,455 | 3/1981 | Cameron . |
| 4,291,613 | 9/1981 | Porter . |
| 4,354,270 | 10/1982 | Nuding . |
| 4,542,767 | 9/1985 | Thornton et al. . |
| 4,706,548 | 11/1987 | Baldauf et al. . |
| 5,113,907 | 5/1992 | Russell . |
| 5,168,173 | 12/1992 | Windsor .................. 301/139 |
| 5,235,217 | 8/1993 | Kirton .................. 307/326 |

FOREIGN PATENT DOCUMENTS

| | | |
|---|---|---|
| 0 497 450 A1 | 8/1992 | European Pat. Off. . |
| 0 558 976 B1 | 7/1995 | European Pat. Off. . |
| 2 002 890 | 7/1971 | Germany . |
| 27 56 240 | 6/1979 | Germany . |
| 29 03 702 | 10/1979 | Germany . |
| 28 39 341 | 3/1980 | Germany . |
| 30 28 196 A1 | 2/1982 | Germany . |
| 32 30 056 A1 | 2/1984 | Germany . |
| 35 29 802 A1 | 2/1987 | Germany . |
| 42 21 756 A1 | 1/1994 | Germany . |

OTHER PUBLICATIONS

Resk 2563.1E Apr. 1990 "Serpar® Crossflow Double Valves with Pressure Switches", Ross Europa GmbH, 1 page, No Date Provided.

Copy of European Search Report dated Apr. 4, 1997.

*Primary Examiner*—Fritz Fleming
*Attorney, Agent, or Firm*—Harness, Dickey & Pierce, P.L.C.

[57] ABSTRACT

A control device contains two electromagnets (61, 62) in a respective current supply circuit (41, 44; 42, 44) which includes a biassed switch (20, 21) having first and second output terminals (2, 4), wherein the switches are biassed towards the first output terminal (2). When the magnets are moved to an active state against a biassing force, the switch in one circuit switches from its first (2) to its second terminal (4) to which the magnet is connected. The first and second terminals (2, 4) of the two switches (20, 21) are connected crosswise, so that a control signal (S1, S2) to the first circuit will initially energize the magnet of the second circuit, and vice versa, wherein the magnet remains in an active state if switching of the switches takes place within the time period taken for one of the magnets to leave its activated state after deactivation, i.e. when the two control signals (S1, S2) are both applied within this time period. The control device may be used, for instance, for the two-hand control of pneumatic clutches and brakes in an eccentric press.

8 Claims, 2 Drawing Sheets

5,796,571

CONTROL DEVICE FOR A TWO-HAND CONTROL MEANS FOR CONTROLLING PRESSES FOR INSTANCE

BACKGROUND AND SUMMARY OF THE INVENTION

The present invention relates to a control device for controlling and monitoring the essentially instantaneous activation of two electromagnets in response to respective simultaneously received electric signals, wherein each of the electromagnets includes an element which in the non-activated state of its associated electromagnet takes a first inactive normal position and which upon activation of said electromagnet is moved to a second active end position, wherein the control device is designed to ensure that the displaceable elements of said electromagnets will be moved to their active end positions essentially simultaneously and remain in said active end position provided that both signals are applied essentially at one and the same time and remain applied.

A control device of this kind finds use for instance in a so-called twin valve of the kind used to control the compressed air supply to a clutch or brake of a machine tool, such as an eccentric press. The control device may be connected, for instance, to a two-handed device which functions to control the supply of compressed air. In this case, it is necessary for the operator to actuate two separate control signal applying contacts essentially simultaneously. The aforesaid two elements may then be comprised of or connected to valve units which allow compressed air to be delivered to the eccentric press when activated. The twin valve will normally also include evacuation valves which are controlled by the two valve units. In order to close the evacuation valves and therewith allow compressed air to pass to the working cylinders of the press through the valve arrangement, it is necessary that the two valve units open rapidly and essentially simultaneously.

However, it will be understood by the person skilled in this art that the inventive control device can be used with other types of magnetically maneuvered elements.

So that the control device to be more readily understood and features thereof made apparent, the device will be described in the following with reference to a so-called twin valve which controls the flow of pressurized fluid to a machine tool where there is a risk of injury to the person or persons in attendance, wherein the twin valve is controlled by two control signals which, e.g., can be established with the aid of two electric switches which must be actuated simultaneously with each hand of the operator in order to open the flow of compressed air to the machine tool.

Rules, legislation and regulations require the valve arrangement to be designed so that malfunctioning of a component in the valve arrangement will not cause further movement in the machine tool. The control system shall also ensure that a new machine working cycle (press cycle) cannot be initiated after a valve component has become defective. The time taken to stop the machine tool during a working cycle (working stroke) in the event of a valve malfunction shall not be of such duration as to place the machine operator at risk.

It is known that these requirements can be fulfilled by delivering pressurized fluid/compressed air to an eccentric press, for instance, through the medium of a so-called double valve. Such double valves are well known to the art. An example of earlier known double valves is found in the valve retailed by Ross Europa GmbH, D-6070 Langen, Germany, under the designation Serpare® cross flow double valve.

Such known double valves/twin valves include two valve units which are normally closed and each of which is moved to an open position by a respective electromagnet in response to control signals applied to said magnets. The valve units are constructed and arranged to lie in series, for instance with respect to the compressed air supply to the consumer. The twin valve also normally includes two evacuation valves which are normally open and which are closed by the valve units as said valve units open. The evacuation valves may be connected in parallel to a drain or exhaust means. It is therefore necessary for the valve units to be opened simultaneously, in order to prevent the compressed air supplied from being evacuated to the drain. Simultaneous opening and closing of the two valve units is monitored by sensing the air pressures in respective valve units when their associated valve elements have begun to open and close respectively. This enables the two air pressures to be mutually compared, wherewith the valve arrangement enables compressed air to pass through the valve units when the sensed pressures are essentially equal to one another and are applied simultaneously. It is known to use for this monitoring process a single cylinder which is divided by a piston into two chambers to which pressure is delivered from an associated valve element. Movement of the piston will result in the electric signal to at least one electromagnet being interrupted, therewith preventing compressed air from being delivered to the machine tool. Another known monitoring system includes two cylinders which are each spring-biassed towards one end position and which are coupled to the pressure in respective valve units such that the position of the piston will give an indication of the pressure in the valve unit, i.e. that the valve unit has begun to open. An electronic monitoring device/logic is adapted to ensure that the electromagnets are prevented from holding the valve units open when the time difference between the pressurization of the valve units exceeds a predetermined value, with the guidance of the two sensed, pressure-controlled piston movements to this end.

Also known to the art is a similar arrangement which includes electric pressure-controlled switches that are switched from one state to another when the pressure in respective valve units corresponds to the supply pressure, said switches controlling the external electromagnetic monitoring arrangement. Such an external electronic monitoring arrangement is expensive and requires signal processing facilities, and is also able to introduce further fault sources that cannot easily be overcome.

An object of the present invention is to provide a control device.

Accordingly, an object of the present invention is to provide a control device that can be readily built-up on a terminal block without requiring signal processing monitoring logic, wherein the actual control device/terminal block can be conveniently mounted, for instance, on a double valve to be controlled by said device, such that only those control signal lines that include the inventive control device need be connected to the unit.

The invention will now be described in more detail with reference to exemplifying embodiments thereof and also with reference to the accompanying drawings.

DETAILED DESCRIPTION OF THE PREFERRED EMBODIMENTS

Figure 1:
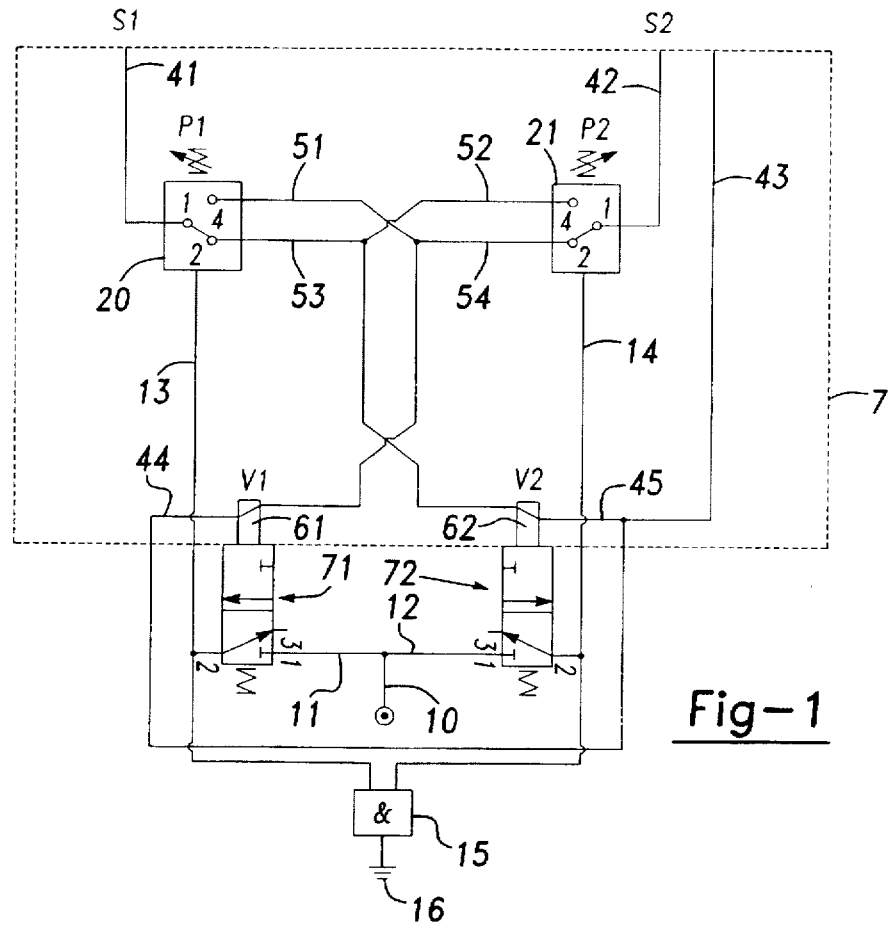
FIG. 1 illustrates schematically a circuit diagram for an inventive control device as applied in a schematically simplified double valve, for controlling a pneumatically controlled clutch and brake of a mechanical eccentric press, for instance.

Shown in FIG. 1 is the inlet end 10 of a compressed air line whose outlet end 16 delivers compressed air to a machine tool, such as an eccentric press. Extending between the ends 10, 16 are two parallel branch lines 11, 12, each including a respective valve 71, 72 of mutually the same design. The valves 71, 72 are normally closed, but can be displaced against the action of a spring to allow fluid to flow to an "and"-function 15 which will allow compressed air to be delivered to the machine tool connected to the outlet 16 when both valves 71, 72 open essentially simultaneously. The illustrated and-function is a simplification intended to facilitate an understanding of the modus operandi of the inventive device. In practice, the and-function 15 may be comprised of the valve arrangement and the flow coupling shown in FIG. 2.

Each of the valves 71, 72 can be displaced to its open position by a respective electromagnet 61 (V1) and 62 (V2).

This can be done manually, for example in the two-hand actuation eccentric press application mentioned above, by way of a signal applied through line 43 (discussed below) to actuate the electromagnets 61 (V1) and 62 (V2), thus opening the valves 71 and 72, respectively.

A fluid-pressure controlled electric switch 20 (P1) senses the pressure prevailing between the valve 71 and the valve 15 via a line 13. The switch 20 has an input terminal 1 which is connected to a control signal source S1 via a line 41. The switch 20 has two output terminals 2, 4. When the pressure in the line 13 overcomes the spring force in the switch 20, the terminal 1 is connected to the output terminal 4. Otherwise, the terminal 1 is connected to the output terminal 2. The terminal 4 of said switch is connected to the magnet 61 by a line 51, and, via the solenoid of the magnet, to the line 44 which is connected to the line 43 and minus potential (the signal source S1 is assumed to be plus potential). When the pressure in the line 13 switches the switch 20 to the output terminal 4, the control signal S1 will thus energize the electromagnet 61 so that compressed air is able to flow to the "and"-valve function 15 through the line 11.

It will be evident from the aforegoing that, basically, when the pressure in the line 13 exceeds a certain chosen pressure limit, the switch is switched from its normal position to its activated position, either directly or indirectly. The switch is often loaded by a spring which biases the switch towards its normal position.

A fluid control switch 21 (P2) senses the pressure prevailing between the valve 72 and the "and"-valve 15 via a line 14. The switch 21 has an input terminal 1 which is connected to a control signal source S2 via a line 42. The switch 21 has two output terminals 2, 4. When the pressure in the line 14 overcomes the spring force in switch 20, the input terminal 1 is connected to the output terminal 4. Otherwise, the input terminal 1 is connected to the output terminal 2. The terminal 4 of switch 21 is connected to the unit 62 (V2) of said valve (72) via a line 52, and, via the magnet solenoid, to the line 45 connected to the line 43 and minus potential or 0-conductor. Thus, when the pressure in line 14 switches the switch 21 to terminal 4, the control signal S2 will energize the magnet 62 so that compressed air is able to flow to the "and"-valve 15 through the line 12.

The terminal 2 of switch 20 is connected to the line 52 via the line 53. The output terminal 2 of the switch 21 is connected to line 51 via a line 54. The output terminals 2, 4 of the two switches 20, 21 are thus permanently connected crosswise to one another.

In the case of both switches 20, 21, the input terminal 1 is held connected to its output terminal 2 provided that the magnets 61, 62 have not been moved from their normal end position, i.e. provided that the valves 71 and 72 have not been moved to their respective open end position. When the magnets 61, 62 and the valves 71, 72 are actuated for movement to their respective other end positions, the input terminals 1 of respective switches 20, 21 will be connected to the output terminals 4.

As shown in the part of FIG. 1 framed in broken lines, the control device 7 functions such that the control signals S1, S2 must be applied essentially simultaneously in order for the magnets 62 and 61 to be actuated to their respective active end positions. And when the magnets 61, 62 are in their activated end positions, the switches 20, 21 are actuated so as to switch and supply current to the magnets 61 and 62 respectively. However, this switch-over assumes that the inertia of the magnets 61, 62 (the valves 71, 72) is so high that the magnets do not have time to leave their activated end position in the time period during which the supply of current to the magnets switches from one control signal to the other. The resetting or restoring means (e.g. the springs) biassing the valves towards their normal positions therefore do not have the time to drive the valves away from their activated end position during the time taken for the switch to switch over.

In FIG. 1, the magnets 61, 62 have been assumed to drive the valves 71, 72 directly, for the sake of simplicity. It will be understood, however, that in practical embodiments the valves 71, 72 may be driven by pilot valves in a conventional manner such as in the prior art device shown in FIG. 2, for example, with the valves 71 and 72 being driven by pilot valves 61a and 62a, respectively, which are in turn actuated by their respective magnets 61 and 62.

An important advantage afforded by the control device 7 is that no monitoring logic is required to sense instantaneousness of the valves 71, 72 (the magnets 61, 62). It is sufficient to couple the switches 20, 21 in the illustrated manner.

It will be evident that the switches 20, 21 need not necessarily be controlled by pressure via fluid lines 13, 14. For instance, the switches 20, 21 can be controlled mechanically by movement of the magnets 61, 62 (or the valves 71, 72). Alternatively, movement of these devices can be sensed electrically for controlling switching of the switches 20, 21.

It will also be evident that the magnets 61, 62 need not control fluid valves, but may also control other types of control means where it is important that movement of the magnets 61, 62 to an active position takes place essentially simultaneously in response to the essentially simultaneous application of the control signals S1 and S2 for respective magnets.

Figure 2:
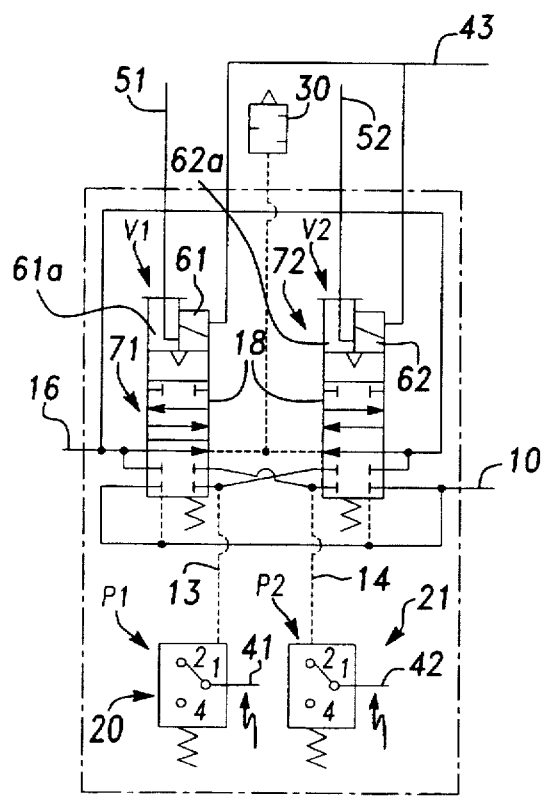
FIG. 2 is a diagrammatic illustration of a known double valve.

FIG. 2 is a diagrammatic illustration of a double valve, or twin valve, sold by Ross Europa GmbH, D-6070 Langen, Germany. The illustrated valve is a "Serpar® cross flow double valve with pressure switches", illustrated in leaflet RESK 256.1E04/90.

The illustrated circuit has been supplemented with signal lines 51, 52 for the control signals applied to the magnets 61, 62 that manoeuver the valves 71, 72. The valves 71, 72 of the prior art FIG. 2 embodiment are of the kind that are series-connected in a forwarding direction and parallel-connected in a direction towards a drain 30, which arrangement can also be employed in connection with the present invention, as will be appreciated by one skilled in the art.

The "and"-function 18 in FIG. 2 corresponds generally to the "and"-function 15 shown in FIG. 1 and includes two valve elements which in the FIG. 2 embodiment are carried by the valves 71, 72 and close the fluid path to the drain 30 when the valves 71, 72 are actuated to their active end positions. When the valve 18 closes its respective drain ports simultaneously, the pressure has insufficient time to fall to such a low level as to cause the switches 20, 21 to switch and cause closing of the double valve.

The switches 20, 21 deliver output signals from their respective terminals 4 when the pressure from the line 10 is sensed in respective valves 71, 72, i.e. when the supply pressure 10 is sensed in the valve units 71, 72 after said units have begun to open and the passage to the drain 30 has been blocked by the drain valves 18.

Figure 3:
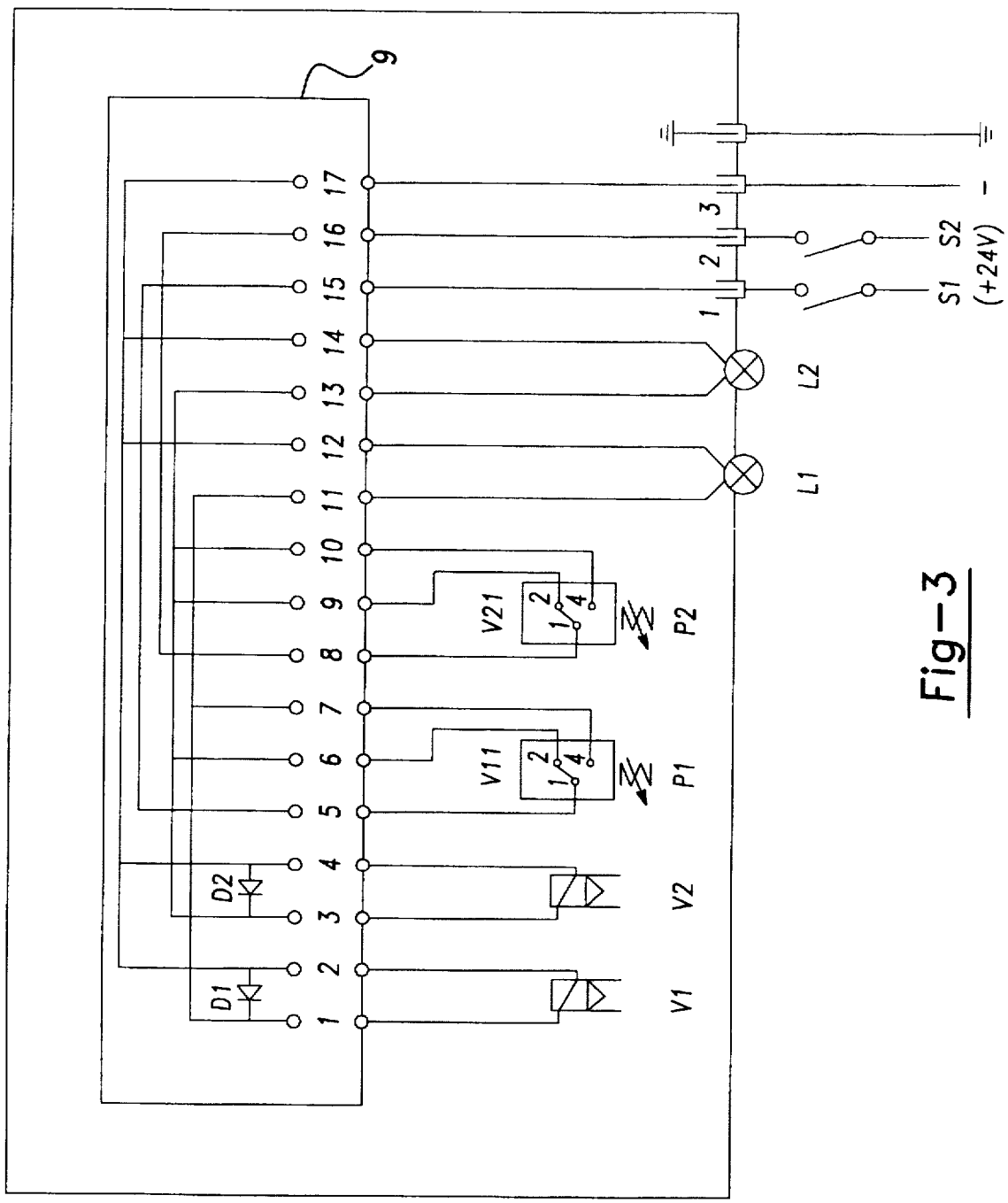
FIG. 3 illustrates the inventive control device when applied to the double valve shown in FIG. 2.

In accordance with the invention, the inventive control device 7 (see FIG. 1) can be established in a known "twin valve", by virtue of connecting the electromagnets V1, V2 and the switches P1, P2 to respective signal sources S1, S2 and coupling the magnets and switches together on a terminal block 9 as illustrated in FIG. 3 (in which the number series 1–17 denotes numbering of the port coupling positions). Indicator lamps L1, L2 may also be connected to the terminal block 9 and caused to light up when the switches P1 and P2 switch to terminal 4.

Protective diodes D1 and D2 may be conveniently mounted on the terminal block 9 in parallel with the magnets V1 and V2 respectively.

The advantage afforded by building up the control device 7 on a simple terminal block 9 is that the block can then be readily fitted to a twin valve corresponding to FIG. 3. The control device, i.e. the terminal block 9, is relatively inexpensive to produce and can therefore be fitted to the twin valve and replaced together with said valve.

Thus, in an inventive double valve, the control device will monitor and eliminate further valve functions and prevent a restart (and possibly also indicate the occurrence of a fault with the aid of lamps L1, L2), when one of the two valve elements 71, 72 remains in an open or a closed position;

one of the two switches remains in an activated or non-activated state;

one of the control signals remains or is excluded;

the asynchronism of the control signals is greater than a set value (e.g. about 50 ms);

the asynchronism of the switches is greater than the aforesaid value; and the asynchronism of the valve elements 71, 72 is greater than the aforesaid value.

What is claimed is:

1. A control device for controlling and monitoring the essentially simultaneous energization of two electromagnets (61, 62) in response to a respective electric signal (S1, S2) applied to said electromagnets essentially simultaneously, wherein each electromagnets includes an element (71, 72) which in a non-energized state of the electromagnet takes a first inactive, normal position and which upon activation of the electromagnet is displaceable to a second active terminal position, wherein the control device is constructed to ensure that the displaceable elements (71, 72) of both electromagnets (61, 62) will be moved to their respective active end positions essentially simultaneously and then remain in said end positions provided that both signals (S1, S2) are applied essentially simultaneously and then both maintained, characterized in that a first control signal line (41, 51) leading to the first electromagnet (61) includes a first electric switch (20) which is controlled by the displaceable element (71) of the first magnet (61), wherein the first switch has an input terminal (1) connected to the signal source (S1) and a first and a second output terminal (2, 4), wherein when moved to its active position the displaceable element (71) of the first electromagnet (61) functions to switch the first switch from its normal position in which the input terminal (1) is connected to the first output terminal (2) to the active position of said switch in which the input terminal (1) is connected to the other output terminal (4); in that a second control signal line (42, 52) leading to the other electromagnet (62) includes a second electric switch (21) which is controlled by the displaceable element (72) of the second electromagnet (62), wherein the second switch (21) has an input terminal (1) which is connected to its associated signal source (S2) and a first and a second output terminal (2, 4), wherein when the displaceable element (72) of the second electromagnet moves to its active position said element functions to switch the second switch (21) from its normal position in which the input terminal (1) is connected to the first output terminal (2) to its active position in which the input terminal (1) is connected to the other output terminal (4); in that the first output terminal (2) of the first switch (20) is connected to the second output terminal (4) of the second switch; in that the first output terminal (2) of the second switch (21) is connected (54) to the second output terminal (4) of the first switch (20); and in that the inertia of the displaceable elements (71, 72) of said electromagnets is such that the displaceable elements have insufficient time to leave their active positions under the influence of means which act to restore said elements to their normal positions within a time period defined essentially as the maximum permitted time difference between the control signals (S1, S2) for activation of the two electromagnets (61, 62).

2. A control device according to claim 1, characterized in that the displaceable elements (71, 72) of the electromagnets (61, 62) comprise normally closed valve units which are supplied with pressure fluid and which function to open a valve arrangement so as to allow the pressure fluid to pass therethrough, when said displaceable elements are moved to their respective active positions simultaneously.

3. A control device according to claim 2, characterized in that each valve unit controls an evacuation valve which connects the outlet side of the valve arrangement to a drain; and in that the evacuation valves are parallel-connected and close the flow path to said drain when the valve units (71, 72) are in an active end position.

4. A control device according to claim 2, characterized in that the valve units (71, 72) are series-connected with respect to the throughflow of pressure fluid.

5. A control device according to claim 2, characterized in that the electromagnets (61, 62) function to drive an associated valve unit (71, 72) indirectly, via a pressure-fluid driven pilot valve.

6. A control device according to claim 2, characterized in that the pressure fluid is compressed air.

7. A control device according to claims 1, characterized in that the switches (20, 21) are controlled to switch to their second output terminal when pressure fluid enters respective valve units (71, 72).

8. A control device according to claim 1, characterized in that the switch terminals, the signal conducting, current supply lines (41, 51; 42, 52) of the electromagnets, and any indicator lines provided are mutually connected to one another on a terminal block (9) which may be fitted adjacent the control device on a valve arrangement to be controlled by said control device.

* * * * *

UNITED STATES PATENT AND TRADEMARK OFFICE
CERTIFICATE OF CORRECTION

PATENT NO. : 5,796,571
DATED : August 18, 1998
INVENTOR(S) : Wetzel, et al

It is certified that error appears in the above-identified patent and that said Letters Patent is hereby corrected as shown below:

Column 2, line 2, "Serpare®" should be --Serpar®--.

Column 6, line 64, Claim 7, "claims" should be --claim--.

Signed and Sealed this

Tenth Day of November 1998

Attest:

BRUCE LEHMAN

*Attesting Officer*     *Commissioner of Patents and Trademarks*